United States Patent
Choi et al.

(10) Patent No.: US 9,859,724 B2
(45) Date of Patent: Jan. 2, 2018

(54) BATTERY PACK AND METHOD OF DRIVING THE SAME

(71) Applicant: SAMSUNG SDI CO., LTD., Yongin-si, Gyeonggi-do (KR)

(72) Inventors: Seunglim Choi, Yongin-si (KR); Gilchoun Yeom, Yongin-si (KR); Buangho Park, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 64 days.

(21) Appl. No.: 14/840,147

(22) Filed: Aug. 31, 2015

(65) Prior Publication Data
US 2016/0241050 A1    Aug. 18, 2016

(30) Foreign Application Priority Data
Feb. 12, 2015  (KR) .......................... 10-2015-0021731

(51) Int. Cl.
*H02J 7/00*  (2006.01)

(52) U.S. Cl.
CPC ..... *H02J 7/0029* (2013.01); *H02J 2007/0095* (2013.01)

(58) Field of Classification Search
USPC .......................................... 320/128
See application file for complete search history.

(56) References Cited

U.S. PATENT DOCUMENTS

| | | | |
|---|---|---|---|
| 2010/0007293 A1* | 1/2010 | Meadors | B60L 11/1811 318/139 |
| 2011/0050000 A1* | 3/2011 | Park | H01M 4/42 307/116 |
| 2012/0212176 A1* | 8/2012 | Park | B60L 3/0046 320/107 |
| 2013/0134944 A1 | 5/2013 | Son | |
| 2015/0280464 A1* | 10/2015 | Kang | B60L 11/1864 320/116 |
| 2015/0288212 A1* | 10/2015 | Kim | H02H 3/24 307/80 |

FOREIGN PATENT DOCUMENTS

| | | |
|---|---|---|
| KR | 10-2012-0095608 A | 8/2012 |
| KR | 10-2013-0061019 A | 6/2013 |

* cited by examiner

*Primary Examiner* — Mohammed Alam
(74) *Attorney, Agent, or Firm* — Lee & Morse, P.C.

(57) ABSTRACT

A battery pack includes a battery to supply power for a device and a battery management system (BMS) to manage the battery. A control current from the battery to the BMS is to be blocked based on a turn-off command.

13 Claims, 4 Drawing Sheets

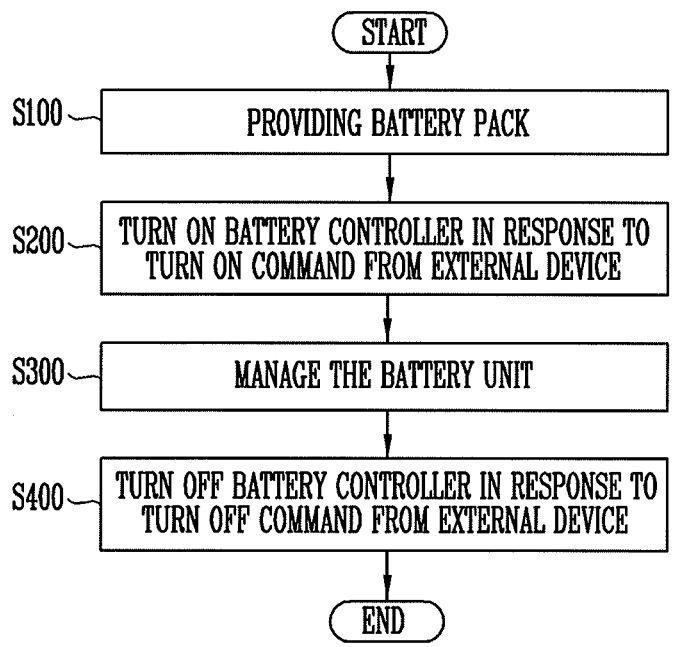
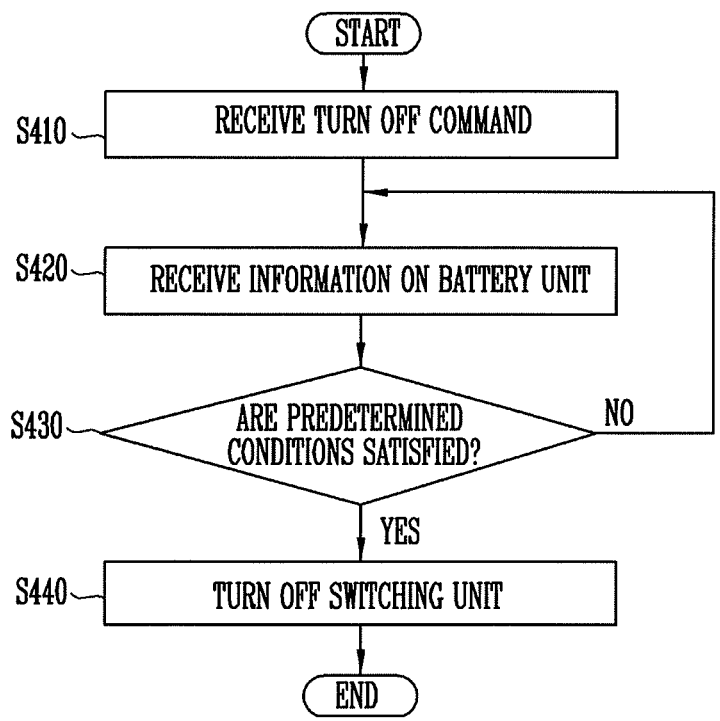

BATTERY PACK AND METHOD OF DRIVING THE SAME

CROSS-REFERENCE TO RELATED APPLICATION

Korean Patent Application No. 10-2015-0021731, filed on Feb. 12, 2015, and entitled, "Battery Pack and Method of Driving the Same," is incorporated by reference herein in its entirety.

BACKGROUND

1. Field

One or more embodiments described herein relate to a battery pack and a method for driving a battery pack.

2. Description of the Related Art

Vehicles have traditionally been driven by an internal combustion engine. These engines cause pollution and noise. Research into alternative ways of driving a vehicle is underway. One way involves replacing the engine with a motor powered by a battery pack. The battery pack includes a battery unit controlled by a battery management system. However, various factors may arise to degrade performance. For example, when a power source is turned off, the BMS still receives current (e.g., leakage current) from the battery unit.

SUMMARY

In accordance with one or more embodiments, a battery pack includes a battery to supply power for a device; and a battery management system (BMS) to manage the battery, wherein a control current from the battery to the BMS is to be blocked based on a turn-off command. The BMS may include a battery controller to receive and operate based on information on the battery; and a switching circuit between the battery and the battery controller to control a level of the control current, wherein the battery controller is to receive the turn-off command and is to turn off the switching circuit to block the control current when one or more predetermined conditions are satisfied.

The battery controller may be electrically coupled to an interface that is to generate a turn-on current based on a turn-on command, switching circuit may include a regulator electrically coupled to the battery controller and a first transistor between the battery and the regulator, a gate electrode of the first transistor may be electrically coupled to the battery controller, and the battery controller may be turned on by the turn-on current, is to turn on the first transistor in a period in which the battery controller is turned on to receive the control current, and is to turn off the first transistor based on the turn-off command.

The switching circuit may include a regulator electrically coupled to the battery controller and first and second transistors between the battery and the regulator, a gate electrode of the first transistor may be electrically coupled to the battery controller and a gate electrode of the second transistor is electrically coupled to an interface that is to generate a turn-on voltage based on the turn-on command, the switching circuit may supply the control current to the battery controller based on the turn-on voltage to turn on the battery controller, and the battery controller may turn on the first transistor in a period in which the battery controller is turned on to receive the control current and is to turn off the first transistor based on the turn-off command. The may be a motor.

In accordance with one or more other embodiments, a method for driving a battery pack includes providing the battery pack; and turning off a battery controller based on a turn-off command, wherein turning off the battery controller includes receiving the turn-off command, receiving information corresponding to a battery, and turning off the switching circuit, and wherein the method includes: turning off the switching circuit when one or more predetermined conditions are satisfied and a control current from the battery to the battery controller is blocked, the control current to the battery controller turned off based on an off state of the switching circuit. The one or more predetermined conditions may include whether a predetermined time has passed after the turn-off command has been received or a predetermined change in an open circuit voltage of the battery has occurred over time.

The method may include turning on the battery controller based on a turn-on command; and managing the battery after turning on the battery controller and before turning off the battery controller. Turning on the battery controller may include receiving a turn-on current; and turning on the switching circuit, wherein the turn-on current is generated by an interface that receives the turn-on command, wherein the battery controller is turned on by the turn-on current, and wherein the battery controller turns on a transistor of the switching circuit to receive the control current.

Turning on the battery controller may include receiving a turn-on voltage; and turning on a first transistor in the switching circuit, wherein the turn-on voltage is generated by an interface that receives the turn-on command, wherein a second transistor of the switching circuit is turned on by the turn-on voltage and the control current is supplied to the battery controller to turn on the battery controller, and wherein the battery controller turns on the first transistor.

In accordance with one or more other embodiments, an apparatus includes at least one signal line; and a controller coupled to the at least one signal line to control a battery, wherein the controller is to block receiving a control current from the battery based on a turn-off command when one or more predetermined conditions are satisfied. The one or more predetermined conditions may include whether a predetermined time has passed after the turn off-command has been received, or whether a difference between a maximum value and a minimum value of an open circuit voltage (OCV) of the battery over a predetermined time is less than a value.

The controller may include a battery controller to receive and operate based on information on the battery; and a switching circuit between the battery and the battery controller to control a level of the control current. The battery controller may control the switching circuit to block receiving the control current from the battery. The battery controller may be electrically coupled to an interface to generate a turn-on current based on a turn-on command.

The switching circuit may include a regulator electrically coupled to the battery controller and a first transistor between the battery and the regulator, a gate electrode of the first transistor may be electrically coupled to the battery controller, and the battery controller may be turned on by the turn-on current, may turn on the first transistor in a period in which the battery controller is turned on to receive the control current, and may turn off the first transistor based on the turn-off command.

The switching circuit may include a regulator electrically coupled to the battery controller and first and second transistors between the battery and the regulator, a gate electrode of the first transistor maybe electrically coupled to the battery controller and a gate electrode of the second transistor is electrically coupled to an interface that is to generate a turn-on voltage based on the turn-on command, the switching circuit may supply the control current to the battery controller based on the turn-on voltage to turn on the battery controller, and the battery controller may turn on the first transistor in a period in which the battery controller is turned on to receive the control current and may turn off the first transistor based on the turn-off command.

The at least one signal line may carry the control current. The at least one signal line may carry a current from an interface coupled to an ignition system. The battery may power a motor.

BRIEF DESCRIPTION OF THE DRAWINGS

Features will become apparent to those of skill in the art by describing in detail exemplary embodiments with reference to the attached drawings in which:

FIG. 3 illustrates an embodiment of a method for driving a battery pack;
FIG. 4 illustrates an example of an operation for turning off a battery controller.

DETAILED DESCRIPTION

Figure 1:
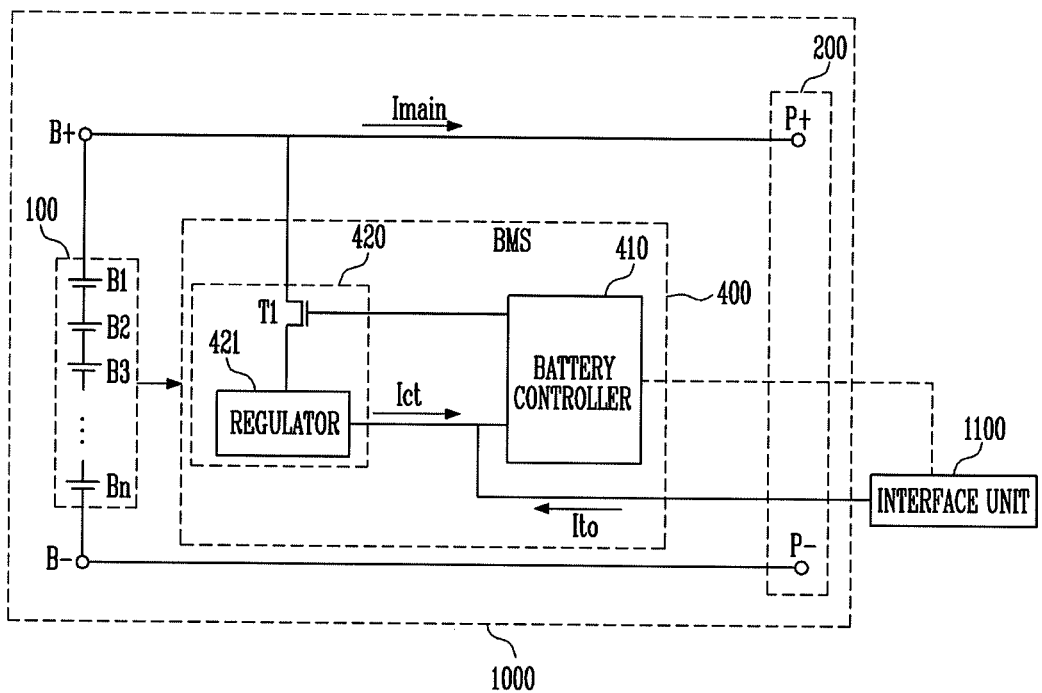
FIG. 1 illustrates an embodiment of a battery pack.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments. Like reference numerals refer to like elements throughout.

FIG. 1 illustrates an embodiment of a battery pack 1000 which includes a battery unit 100, an output terminal 200, and a battery management system (BMS) 400. The battery unit 100 includes a plurality of batteries B1 to Bn, a positive electrode B+, and a negative electrode B−.

The output terminal 200 includes a positive output terminal P+ and a negative output terminal P−. The positive output terminal P+ is electrically coupled to the positive electrode B+, and the negative output terminal P− is electrically coupled to the negative electrode B−.

The BMS 400, which may be considered to be a controller, includes a battery controller 410 and a switching unit 420 for managing the battery unit 100. The battery controller 410 receives and operates based on information corresponding to the battery unit 100. The BMS 400 may directly receive the information or may receive the information through one or more measuring units or sensors. In one embodiment, the information includes time at which a turn off command is received and an open circuit voltage (OCV). The information may also include a level of an output current and a state of charge (SOC) of one or more of the batteries B1 to Bn. In one embodiment, all of the batteries B1 to Bn may be considered a battery.

The battery controller 410 transmits a signal to an external device based on the received information. The signal may provide an indication of whether the battery unit 100 is chargeable, dischargeable, or out of order. The battery controller 410 is turned on by a turn-on current Ito from an interface unit 1100 in a predetermined period. The battery controller turns on a first transistor T1 in the period in which the battery controller 410 is turned on to receive a control current Ict.

After a turn-off command is received from the external device and when one or more predetermined conditions are satisfied, the switching unit 420 is turned off to block the control current Ict. The turn-off command may be received by the BMS 400 from the external device through the interface unit 1100, or may be received by the BMS 400 through another path.

The battery controller 410 determines whether the predetermined conditions are satisfied based on the received information on the battery unit 100. In one embodiment, the switching unit 420 may only be turned off only when the one or more predetermined conditions are satisfied. The one or more predetermined conditions may include whether a predetermined time has passed after the turn off-command has been received and whether a difference between a maximum value and a minimum value of the OCV for predetermined uniform time is less than a predetermined value.

The switching unit 420 is between the battery unit 100 and the battery controller 410 and includes the first transistor T1 and a regulator 421. The first transistor T1 is between the battery unit 100 and the regulator 421 and a gate electrode of the first transistor T1 is electrically coupled to the battery controller 410. The battery controller 410 controls a level of the control current Ict by changing a voltage level supplied to the gate electrode of the first transistor T1. When the one or more predetermined conditions are satisfied and based on the turn-off command from the external device, the switching unit 420 is turned off and the control current Ict is blocked since the first transistor T1 of the switching unit 420 is turned off. The regulator 421 removes ripple in a current from the battery unit 100.

The interface unit 1100 generates the turn on current Ito based on a turn-on command from the external device. The interface unit 1100 is electrically coupled to the battery controller 410. When the control current Ict is blocked to turn off the battery controller 410 and when the turn-on current Ito from the interface unit 1100 is supplied to the battery controller 410, the battery controller 410 is turned on in a predetermined period. While the battery controller 410 is turned on, the first transistor T1 of the switching unit 420 is turned on to receive the control current Ict. Although the predetermined period is terminated, the battery controller 410 that receives the control current Ict is not turned off but remains in a turned-on state. An ignition key or system used for an electric vehicle may be used as the interface unit 1100. The interface unit 1100 may transmit the turn-off command and the turn-on command to the battery controller 410.

Figure 2:
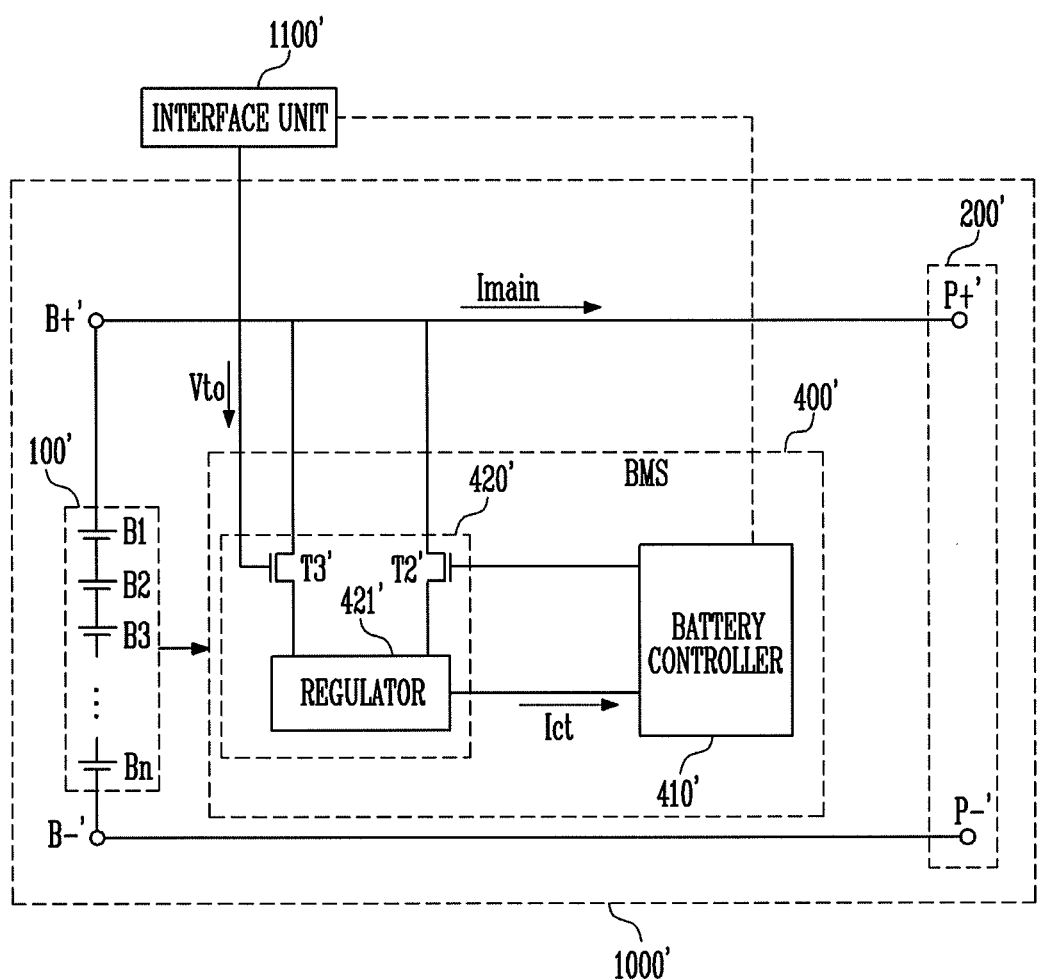
FIG. 2 illustrates another embodiment of a battery pack.

FIG. 2 illustrates another embodiment of a battery pack 1000' which includes a battery unit 100', an output terminal 200', and a BMS 400'. The battery unit 100' and the output terminal 200' may be the same as battery unit 100 and the output terminal 200, respectively.

The BMS 400' includes a battery controller 410' and a switching unit 420'. The switching unit 420' includes a second transistor T2', a third transistor T3', and a regulator 421'. The gate electrode of the second transistor T2' is electrically coupled to the battery controller 410', and the gate electrode of the third transistor T3' is electrically coupled to an interface unit 1100' that generates a turn-on voltage Vto based on a turn-on command from an external device.

The battery controller 410' receives and operates based on information corresponding to the battery unit 100'. The BMS 400' may directly receive the information or may receive the information through a measuring unit or sensor. The information may be the same as discussed for the embodiment of FIG. 1.

The battery controller 410' transmits a signal to the external device based on the received information. The signal may provide an indication of whether the battery unit 100' is chargeable, dischargeable, or out of order. After a turn-off command is received from the external device and when one or more predetermined conditions are satisfied, the switching unit 420' is turned off to block a control current Ict. The turn-off command may be received by the BMS 400' from the external device through the interface unit 1100', or may be received by the BMS 400' through another path. The battery controller 410' determines whether the one or more predetermined conditions are satisfied based on the received information on the battery unit 100'. In accordance with one embodiment, the switching unit 420' may be turned off only when one or more predetermined conditions are satisfied. The one or more predetermined conditions may be the same as discussed relative to the embodiment of FIG. 1.

The switching unit 420' is between the battery unit 100' and the battery controller 410' and includes a second transistor T2', a third transistor T3', and a regulator 421'. The second transistor T2' and the third transistor T3' are between the battery unit 100' and the regulator 421'. The gate electrode of the second transistor T2' is electrically coupled to the battery controller 410', and the gate electrode of the third transistor T3' is electrically coupled to the interface unit 1100'.

The interface unit 1100' generates the turn-on voltage Vto based on the turn-on command from the external device. The battery controller 410' controls a level of the control current Ict by changing a voltage level supplied to the gate electrode of the second transistor T2'. The second transistor T2' is turned off based on the turn-off command from the external device and the control current Ict is blocked since the second transistor T2' is turned off. The regulator 421' removes ripple in current from the battery unit 100'.

The interface unit 1100' generates the turn-on voltage Vto based on the turn-on command from the external device. The interface unit 1100' is electrically coupled to the gate electrode of the third transistor T3'. When the control current Ict is blocked to turn off the battery controller 410' and when the turn-on voltage Vto from the interface unit 1100' is supplied to the third transistor T3', the third transistor T3' is turned on in a predetermined period. The control current Ict is supplied to the battery controller 410' since the third transistor T3' is turned on. While the battery controller 410' is turned on, the second transistor T2' of the switching unit 420' is turned on to receive the control current Ict. Although the predetermined period is terminated, since the second transistor T2' is turned on, the battery controller 410' that receives the control current Ict is not turned off but remains in a turned-on state. The interface unit 1100' may transmit not only the turn-on command but also the turn-off command to the battery controller 410'. The ignition key or system of the vehicle may be used as the interface unit 1100'.

FIG. 3 illustrates an embodiment of a method for driving a battery pack, which, for example, may correspond to the battery pack of FIG. 1. The method includes, in operation S100, providing battery pack 1000 including the battery unit 100 and the BMS 400. The BMS 400 includes the battery controller 410 and the switching unit 420, and the interface unit 1100 is electrically coupled to the battery controller 410.

In operation S200, the battery controller 410 is turned on based on the turn-on command from the external device.

In operation S300, the battery unit 100 is managed by the BMS 400. The BMS 400 receives and operates based on the information on the battery unit 100. The battery controller 410 transmits the signal, providing an indication of whether the battery unit 100 is chargeable, dischargeable, or out of order, to the external device based on the received information. The battery controller 410 controls the level of the control current Ict by controlling the level of the voltage supplied to the gate electrode of the first transistor T1.

In operation S400, the battery controller 410 is turned off based on the turn-off command from the external device.

FIG. 4 illustrates an example of an operation for turning off the BMS in the method of FIG. 3. This operation will be described with reference to FIGS. 1, 3, and 4.

In operation S410, the turn-off command is received by the battery controller 410. The turn-off command may be received from the external device through the interface unit 1100 or an another path.

In operation S420, the battery controller 410 receives information of the battery unit 100. The information may include, for example, the time at which the turn-off command is received and/or the OCV, and/or in one embodiment may include the level of the output current and the SOC of each battery B1 to Bn.

In operation S430, the battery controller 410 determines whether the one or more predetermined conditions are satisfied. The one or more predetermined conditions may include, for example, whether predetermined time has passed after the turn-off command is received or whether the difference between the maximum value and the minimum value of the OCV for the predetermined uniform time is less than the predetermined value. In one embodiment, it may be determined whether the one or more predetermined conditions are satisfied based on various references. When it is determined that at least one of the one or more predetermined conditions is not satisfied, the operation S420 is performed and the battery controller 410 receives the information on the battery unit 100 again.

In operation S440, the battery controller 410 turns off the switching unit 420.

Since the first transistor T1 in the switching unit 420 is turned off to block the control current Ict and the turn-on current Ito is not supplied, the battery controller 410 is turned off.

Figure 5:
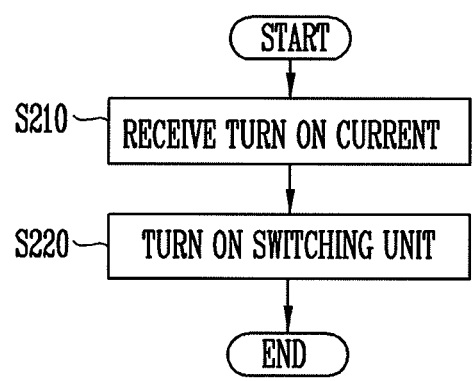
FIG. 5 illustrates an example of an operation for turning on a battery controller.

FIG. 5 illustrates an example of an operation for turning on the BMS in the method of FIG. 3. The operation will be described with reference to FIGS. 1, 3, and 5.

In operation S210, the battery controller 410 receives the turn-on current Ito and is turned on in a predetermined period. The turn-on current Ito is generated by the interface unit 1100 that receives the turn-on command from the external device.

In operation S220, the battery controller 410 turned on in the predetermined period turns on the switching unit 420. For example, the battery controller 410 changes the level of the voltage supplied to the gate electrode of the first transistor T1 and turns on the first transistor T1. Although the predetermined period is terminated, the battery controller 410 that receives the control current Ict is not turned off since the first transistor T1 is turned on.

Figure 6:
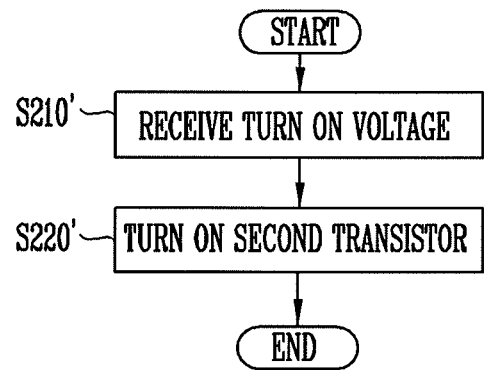
FIG. 6 illustrates another example of an operation for turning on a battery controller.

FIG. 6 illustrates an example of an operation for turning on the BMS in accordance with another method for driving a battery pack. The battery pack may be battery pack 1000', and thus the operation for turning on the BMS may be described with reference to FIGS. 2, 3, and 6.

In operation S210', the third transistor T3' receives the turn-on voltage Vto and is turned on in a predetermined period. The turn-on voltage Vto is generated by the interface unit 1100' that receives the turn-on command from the external device. Since the third transistor T3' is turned on, the control current Ict is supplied to the battery controller 410' so that the battery controller 410' is turned on in the predetermined period.

In operation S220', the battery controller 410' turned on in the predetermined period turns on the second transistor T2'. For example, the battery controller 410' changes the level of the voltage supplied to the gate electrode of the second transistor T2' and turns on the second transistor T2'. Although the predetermined period is terminated, the battery controller 410' that receives the control current Ict is not turned off since the second transistor T2' is turned on.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The BMS, controllers, and other processing features of the disclosed embodiments may be implemented in logic which, for example, may include hardware, software, or both. When implemented at least partially in hardware, the BMS, controllers, and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the BMS, controllers, and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments described herein.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A battery pack, comprising:
   a battery to supply power for a device;
   a battery management system (BMS) to manage the battery; and
   a signal line to transfer a turn-off command from an external host system to the BMS, wherein the BMS is to generate a control signal to block transfer of a control current from the battery to the BMS based on the turn-off command, wherein the BMS includes:
   a battery controller to receive and operate based on information on the battery; and
   a switching circuit between the battery and the battery controller to control a level of the control current, wherein the battery controller is to receive the turn-off command and is to generate the control signal to turn off the switching circuit to block the control current when one or more predetermined conditions are satisfied, and wherein:
   the switching circuit includes a regulator electrically coupled to the battery controller and first and second transistors between the battery and the regulator,
   a gate electrode of the first transistor is electrically coupled to the battery controller and a gate electrode of the second transistor is electrically coupled to an interface that is to generate a turn-on voltage based on the turn-on command,
   the switching circuit is to supply the control current to the battery controller based on the turn-on voltage to turn on the battery controller, and
   the battery controller is to turn on the first transistor in a period in which the battery controller is turned on to receive the control current and is to generate the control signal to turn off the first transistor based on the turn-off command.

2. The battery pack as claimed in claim 1, wherein:
   the battery controller is electrically coupled to an interface that is to generate a turn-on current based on a turn-on command,
   switching circuit includes a regulator electrically coupled to the battery controller and a first transistor between the battery and the regulator,
   a gate electrode of the first transistor is electrically coupled to the battery controller, and
   the battery controller is to be turned on by the turn-on current, is to turn on the first transistor in a period in which the battery controller is turned on to receive the control current, and is to generate the control signal to turn off the first transistor based on the turn-off command.

3. The battery pack as claimed in claim 1, wherein the battery is to power a motor.

4. A method for driving a battery pack, the method comprising:
providing the battery pack; and
turning off a battery controller based on a turn-off command, wherein turning off the battery controller includes receiving the turn-off command from an external host system, receiving information corresponding to a battery, and generating a control signal to turn off a switching circuit, and when one or more predetermined conditions are satisfied and a control current from the battery to the battery controller is blocked, the control current to the battery controller is turned off based on an off state of the switching circuit, and
wherein the switching circuit includes a regulator electrically coupled to the battery controller and first and second transistors between the battery and the regulator, a gate electrode of the first transistor electrically coupled to the battery controller and a gate electrode of the second transistor electrically coupled to an interface, and wherein the method includes:
generating a turn-on voltage based on the turn-on command,
supplying the control current from the switching circuit to the battery controller based on the turn-on voltage of the battery controller,
turning on the first transistor in a period in which the battery controller is turned on to receive the control current, and
generating the control signal to turn off the first transistor based on the turn-off command.

5. The method as claimed in claim 4, wherein the one or more predetermined conditions include:
whether a predetermined time has passed after the turn-off command has been received, or
a predetermined change in an open circuit voltage (OCV) of the battery has occurred over time.

6. The method as claimed in claim 4, further comprising:
managing the battery after turning on the battery controller and before turning off the battery controller.

7. An apparatus, comprising:
at least one signal line; and
a controller coupled to the at least one signal line to control a battery,
wherein the controller is to generate a control signal to block receiving a control current from the battery based on a turn-off command from an external host system when one or more predetermined conditions are satisfied, wherein the controller includes:
a battery controller to receive and operate based on information on the battery; and
a switching circuit between the battery and the battery controller to control a level of the control current, wherein the battery controller is electrically coupled to an interface to generate a turn-on current based on a turn-on command, and wherein:
the switching circuit includes a regulator electrically coupled to the battery controller and a first transistor between the battery and the regulator,
a gate electrode of the first transistor is electrically coupled to the battery controller, and
the battery controller is to be turned on by the turn-on current, is to turn on the first transistor in a period in which the battery controller is turned on to receive the control current, and is to generate the control signal to turn off the first transistor based on the turn-off command.

8. The apparatus as claimed in claim 7, whether the one or more predetermined conditions include:
whether a predetermined time has passed after the turn-off command has been received, or
whether a difference between a maximum value and a minimum value of an open circuit voltage (OCV) of the battery over a predetermined time is less than a value.

9. The apparatus as claimed in claim 7, wherein the battery controller is to generate the control signal to control the switching circuit to block receiving the control current from the battery.

10. The apparatus as claimed in claim 7, wherein:
the switching circuit includes a regulator electrically coupled to the battery controller and first and second transistors between the battery and the regulator,
a gate electrode of the first transistor is electrically coupled to the battery controller and a gate electrode of the second transistor is electrically coupled to an interface that is to generate a turn-on voltage based on the turn-on command,
the switching circuit is to supply the control current to the battery controller based on the turn-on voltage to turn on the battery controller, and
the battery controller is to turn on the first transistor in a period in which the battery controller is turned on to receive the control current and is to generate the control signal to turn off the first transistor based on the turn-off command.

11. The apparatus as claimed in claim 7, wherein the at least one signal line is to carry the control current.

12. The apparatus as claimed in claim 7, wherein the at least one signal line is to carry a current from an interface coupled to an ignition system which corresponds to the external host system.

13. The apparatus as claimed in claim 7, wherein the battery is to power a motor.

* * * * *